(12) United States Patent
Liao

(10) Patent No.: US 11,716,299 B2
(45) Date of Patent: Aug. 1, 2023

(54) INFORMATION INTERACTION METHOD AND APPARATUS, SERVER, SYSTEM AND STORAGE MEDIUM

(71) Applicant: BEIJING BYTEDANCE NETWORK TECHNOLOGY CO., LTD., Beijing (CN)

(72) Inventor: Yudong Liao, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/691,960

(22) Filed: Mar. 10, 2022

(65) Prior Publication Data
US 2022/0200940 A1 Jun. 23, 2022

Related U.S. Application Data

(63) Continuation of application No. PCT/CN2021/089214, filed on Apr. 23, 2021.

(30) Foreign Application Priority Data

Apr. 30, 2020 (CN) .......................... 202010364610.5

(51) Int. Cl.
*H04L 51/046* (2022.01)
*H04L 51/42* (2022.01)

(52) U.S. Cl.
CPC ............ *H04L 51/046* (2013.01); *H04L 51/42* (2022.05)

(58) Field of Classification Search
CPC .............................. H04L 51/046; H04L 51/42
See application file for complete search history.

(56) References Cited

U.S. PATENT DOCUMENTS

2007/0002825 A1* 1/2007 O'Brien .................. H04L 51/04
370/351
2008/0208984 A1* 8/2008 Rosenberg .............. H04L 51/04
709/206
(Continued)

FOREIGN PATENT DOCUMENTS

CN 101079785 A 11/2007
CN 101179520 A 5/2008
(Continued)

OTHER PUBLICATIONS

International Patent Application No. PCT/CN2021/089214, International Search Report dated Jul. 20, 2021, 12 pages with English Translation.
(Continued)

*Primary Examiner* — Austin J Moreau

(57) ABSTRACT

An information interaction method and apparatus, a server, a system and a storage medium are provided. The method includes: receiving a group creating request message including an identification of a group member and create a discussion group including the group member based on the group creating request message, where the group creating request message is sent by a mail server; and send a group creating notification message to an IM client device of the group member, to display the discussion group on the IM client device based on the group creating notification message. Information intercommunication and fusion in different servers can be realized by means of the cooperative working of an IM server and a mail server, thereby improving the information processing efficiency and satisfying office requirements of a user.

19 Claims, 4 Drawing Sheets

(56) References Cited

U.S. PATENT DOCUMENTS

| | | | | |
|---|---|---|---|---|
| 2012/0191787 | A1* | 7/2012 | Huang | H04L 51/066 |
| | | | | 709/206 |
| 2016/0212091 | A1* | 7/2016 | Volach | H04L 41/026 |
| 2016/0323235 | A1* | 11/2016 | Lindsay | H04L 51/04 |
| 2016/0366077 | A1* | 12/2016 | Dong | H04L 51/56 |
| 2017/0099238 | A1* | 4/2017 | Malik | H04L 51/216 |
| 2018/0343214 | A1* | 11/2018 | Shen | H04L 51/48 |
| 2019/0327192 | A1* | 10/2019 | Li | G06F 16/9027 |

FOREIGN PATENT DOCUMENTS

| | | | |
|---|---|---|---|
| CN | 101188578 | A | 5/2008 |
| CN | 101237428 | A | 8/2008 |
| CN | 101594318 | A | 12/2009 |
| CN | 102340456 | A | 2/2012 |
| CN | 104144387 | A | 11/2014 |
| CN | 106603391 | A | 4/2017 |
| CN | 108306810 | A | 7/2018 |
| CN | 109918345 | A | 6/2019 |
| CN | 111798207 | A | 10/2020 |
| WO | 2010/121152 | A2 | 10/2010 |

OTHER PUBLICATIONS

First Office Action dated Mar. 30, 2022 in Chinese Patent Application No. 202010364610.5 (10 pages) with an English translation (11 pages).

* cited by examiner

INFORMATION INTERACTION METHOD AND APPARATUS, SERVER, SYSTEM AND STORAGE MEDIUM

The present application is a continuation of International Application No. PCT/CN2021/089214, filed on Apr. 23, 2021, which claims priority to Chinese Patent Application No. 202010364610.5, titled "INFORMATION INTERACTION METHOD AND APPARATUS, SERVER, SYSTEM AND STORAGE MEDIUM", filed on Apr. 30, 2020 with the China National Intellectual Property Administration, both of which are incorporated herein by reference in their entireties.

FIELD

Embodiments of the present disclosure relate to the field of communication technology, and in particular to an information interaction method and apparatus, a server, a system and a storage medium.

BACKGROUND

At present, in the field of communication technology, multiple communication modes or media are generally involved. For example, mail related functions are realized through a mail server to provide a service, and instant messaging (IM) related functions are realized through an instant messaging (IM) server to provide a service.

When the present disclosure is envisaged, it is found that in some implementations, for each of the servers, the amount of information of the server will surge in the above communication mode, in the case of a long communication time period. In this way, communication processing efficiency is reduced, and thus office requirements of users cannot be met.

SUMMARY

An information interaction method and apparatus, a server, a system and a storage medium are provided according to embodiments of the present disclosure, to realize cooperative work of a mail server and an instant messaging server.

In a first aspect, an information interaction method is provided according to an embodiment of the present disclosure. The method includes: receiving a group creating request message comprising an identification of a group member, and creating a discussion group including the group member based on the group creating request message, where the group creating request message is sent by a mail server; and sending a group creating notification message to an IM client device of the group member, to display the discussion group on the IM client device based on the group creating notification message.

In a second aspect, an information interaction method is provided according to another embodiment of the present disclosure. The method includes: receiving a sharing instruction generated by a mail client device of a sharer based on a target email, and generating a group creating request massage including an identification of a group member based on the sharing instruction; and sending the group creating request massage to an IM server, such that the IM server creates a discussion group including the group member based on the group creating request message, and sends the group creating notification message to IM client device of the group member, to display the discussion group on the IM client device based on the group creating notification message.

In a third aspect, an information interaction apparatus is provided according to an embodiment of the present disclosure. The apparatus includes: a discussion group creating module and a group creating notification message sending module. The discussion group creating module is configured to receive a group creating request message including an identification of a group member and create a discussion group including the group member based on the group creating request message, where the group creating request message is sent by a mail server. The group creating notification message sending module is configured to send a group creating notification message to IM client device of the group member, to display the discussion group on the IM client device based on the group creating notification message.

In a fourth aspect, an information interaction apparatus is provided according to another embodiment of the present disclosure. The apparatus includes a group creating request message generation module and a group creating request message sending module. The group creating request message generation module is configured to receive a sharing instruction generated by a mail client device of a sharer based on the target email, and create a group creating request massage including an identification of a group member based on the sharing instruction. The group creating request message sending module is configured to send the group creating request massage to the IM server, such that the IM server creates a discussion group including the group member based on the group creating request message and sends a group creating notification message to an IM client device of the group member, to display the discussion group on the IM client device based on the group creating notification message.

In a fifth aspect, an IM server is further provided according to an embodiment of the present disclosure. The IM server includes one or more processors and a storage device. The storage device is configured to store one or more programs that, when being executed by the one or more processors, cause the one or more processors to perform the method according to any one of the embodiments of the present disclosure.

In a sixth aspect, a mail server is further provided according to an embodiment of the present disclosure. The mail server includes one or more processors and a storage device. The storage device is configured to store one or more programs that, when being executed by the one or more processors, cause the one or more processors to perform the method according to any one of the embodiments of the present disclosure.

In a seventh aspect, an information interaction system is further provided according to an embodiment of the present disclosure. The information interaction system includes the IM server and the mail server described above.

In an eighth aspect, a computer-readable storage medium is provided according to an embodiment of the present disclosure. The computer-readable storage medium stores a computer program that, when being executed by a processor, performs the method according to any one of the embodiments of the present disclosure.

An information interaction method and apparatus, a server, a system and a storage medium are provided according to the embodiments of the present disclosure. Through the cooperative work of the IM server the mail server, exchange and integration of information in different servers are realized, so as to improve the information processing efficiency and meet the office requirements of users.

BRIEF DESCRIPTION OF THE DRAWINGS

The above and other features, advantages and aspects of the embodiments of the present disclosure will become clearer in conjunction with the drawings and with reference to the embodiments. Throughout the drawings, same or similar reference numerals are used to represent the same or similar components. It should be noted that the drawings are schematic, and components and elements are not necessarily drawn to scale.

DETAILED DESCRIPTION OF EMBODIMENTS

Figure 1:
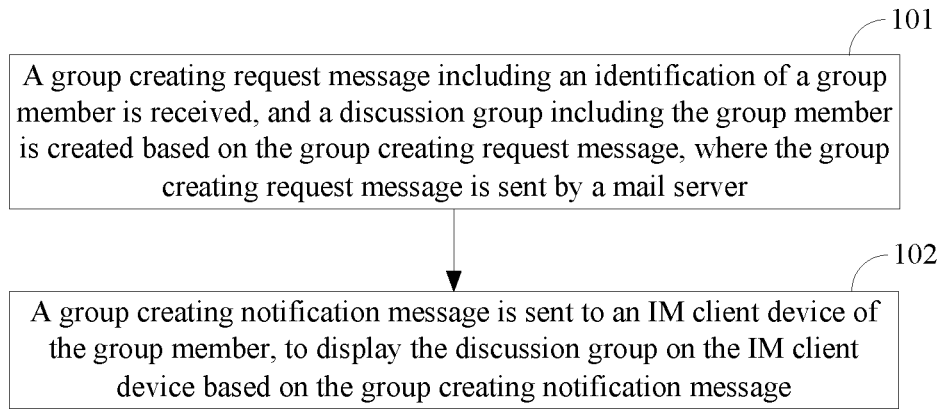
FIG. 1 is a flowchart of an information interaction method according to a first embodiment of the present disclosure.

The embodiments of the present disclosure are described in more detail below with reference to the drawings. Although some embodiments of the present disclosure are shown in the drawings, it should be understood that the present disclosure may be implemented in various forms and should not be construed as limited to the embodiments set forth herein. These embodiments are provided for a thorough and complete understanding of the present disclosure. It should be understood that the drawings and embodiments of the present disclosure are only for exemplary purposes and are not intended to limit the protection scope of the present disclosure.

It should be understood that the steps recorded in the method embodiments of the present disclosure may be performed in a different order and/or performed in parallel. In addition, the method embodiments may include additional steps and/or steps without being performed, and the scope of the present disclosure is not limited in this regard.

Meaning of the term "including" and deformation thereof used in the present disclosure are open, that is, "including but not limited to". The term "based on" means "at least partially based on". The term "an embodiment" means "at least one embodiment". The term "another embodiment" means "at least one other embodiment". The term "some embodiments" means "at least some embodiments". Definitions of other terms are given in the following description.

It should be noted that concepts of "first", "second" and the like mentioned in the present disclosure are only used to distinguish different apparatus, modules or units, and are not used to limit the order or interdependence of functions performed by these apparatus, modules or units.

It should be noted that the modifications of "one" and "multiple" mentioned in the present disclosure are schematic rather than restrictive, and those skilled in the art should understand that the terms should be understood as "one or more" unless otherwise clearly indicated in the context.

When the present disclosure is envisaged, it is found that in some implementations, if mail related functions are realized through a mail server alone to provide a service or instant messaging related functions are realized through an IM server alone to provide a service, for each of the servers, the amount of information of the server will surge in the case of a long communication time period. In this way, communication processing efficiency is reduced, and thus office requirements of users cannot be met. In view of this, with the technical solutions of the embodiments of the present disclosure, exchange and integration of information in different servers are realized through cooperative work of the instant messaging IM server and the mail server, so as to improve the information processing efficiency and meet the office requirements of users.

First Embodiment

FIG. 1 is a flowchart of an information interaction method according to a first embodiment of the present disclosure. This embodiment of the present disclosure is applied to a case where an IM server cooperates with a mail server. The method may be performed by an information interaction apparatus according to an embodiment of the present disclosure. The apparatus may be implemented in a form of software and/or hardware and may generally be integrated in a computer device. The method according to this embodiment of the present disclosure includes the following steps.

As shown in FIG. 1, the method according to an embodiment of the present disclosure includes the following steps 101 and 102.

In step 101, a group creating request message including an identification of a group member is received, and a discussion group including the group member is created based on the group creating request message. The group creating request message is sent by a mail server.

In an embodiment, the group member may include a sharer and a shared member of the target email. The "a discussion group including the group member is created based on the group creating request message" in the step 101 is performed by: creating a discussion group including the sharer and the shared member based on the group creating request message.

It should be noted that in an embodiment of the present disclosure, the number of the sharer may be one, and the number of the shared member may be multiple. The number of the shared member is not limited in the embodiments of the present disclosure.

In an embodiment, the group creating request message is generated through the mail server by: receiving a sharing instruction, where the sharing instruction is generated by a mail client device of the sharer based on the target email, and the sharing instruction includes the identification of the group member; and generating the group creating request message based on the sharing instruction.

The identification of the group member included in the sharing instruction may be a name of the group member or an avatar of the group member. The type of identification is not limited in this embodiment. As long as the group members can be identified through the identifications, the type of identifications is within the protection scope of the present disclosure. The mail server receives the sharing instruction. The sharing instruction is generated by the mail client device of the sharer in the group member based on the target email. The sharing instruction may include the identification information of the target email and the identification of the group member. In addition, the mail server generates the group creating request message based on the sharing instruction. The group creating request message includes the identification of the group member and group identification. The IM server creates a discussion group based on the group creating request message, such that each group member in the discussion group views the target email, and discusses the target email shared by the sharer in the created discussion group. Therefore, the discussion group in this embodiment is created based on a scenario of sharing the target email.

In an embodiment, the group member may include a participant of the target email. The participant of the target email refers to a user who is related to the target email or participates in processing the target email. For example, participants of the target email may be a sender, a recipient and a carbon copy person of the target email. That is, the group member may include the sender, the recipient and the carbon copy person of the target email. The "a discussion group including the group member is created based on the group creating request message" in the step 101 is performed by: creating a discussion group including at least one of the sender, the recipient and the carbon copy person, based on the group creating request message.

It should be noted that the numbers of the sender, the recipient and the carbon copy person is not limited in this embodiment of the present disclosure.

In an embodiment, the group request message is generated through the mail server by: receiving a merge instruction generated by a mail client device of the recipient based on the target email, where the merge instruction is an instruction including identification information of all target emails to be merged and the identification of the group member; and generating the group creating request message based on the merge instruction.

The identification of the group member included in the merge instruction may be a name of the group member or an avatar of the group member. The type of identification is not limited in this embodiment. As long as the group member can be identified through the identification, the type of identification is within the protection scope of the present disclosure. The mail server receives the merge instruction, which is generated by the mail client device of the recipient in the group member based on the target email. The merge instruction includes the identification information of all target emails to be merged and the identification of the group member. In addition, the mail server generates the group creating request message based on the merge instruction. The group creating request message includes the identification of the group member and group identification. The IM server creates a discussion group based on the group creating request message, such that each group member in the discussion group may view all the target emails to be merged, and discuss the target email merged by the recipient in the created discussion group. Therefore, the discussion group in this embodiment is created based on a scenario of merging target emails.

It should be noted that in the present disclosure, the group member include not only the sharer, the shared member, the sender, the recipient and the carbon copy person of the target email, but also other participants of the target email, such as, a forwarder forwarding the target email. Further, a discussion group is created based on these participants. A creation process is similar to that of the above discussion group, which will not be repeated herein.

In addition, in the present disclosure, in addition to creating a discussion group based on the scenario of sharing the target email and the scenario of merging the target email, a discussion group may also be created based on other application scenarios of the target email (such as a scenario of forwarding the target email and a scenario of grouping the target emails), and a creation process is similar to that of the above discussion group, which will not be repeated herein. In an implementation, when a new event related to the target email occurs, a new processing instruction generated by the mail client device of a user based on the target email is received, and the user is added to the created discussion group as a group member based on an identification of the user included in the processing instruction. For example, when the target email is forwarded by a forwarder, the forwarding instruction generated by the mail client device of the forwarder based on the target email is received, and then the forwarder is added to the created discussion group as a group member based on an identification of the forwarder in a forwarding instruction.

In step 102, a group creating notification message is sent to an IM client device of the group member, to display the discussion group on the IM client device based on the group creating notification message.

In an embodiment, after the discussion group including the group member is created based on the group creating request message, the method may further include: sending the group creating notification message to mail client device through the mail server, to display the discussion group on the mail client device based on the group creating notification message. In this implementation, by sending the group creating notification message to the mail client device, the discussion group created by the IM server are displayed on the mail client device.

In an embodiment, the IM server generates the group creating notification message after creating the discussion group. The group creating notification message includes relevant information of the created discussion group, such as the group member in the discussion group, an identification of each group member and a creation time of the discussion group. The IM server not only sends the group creating notification message generated for the creation of the discussion group to the IM client device of each group member, but also sends the group creating notification message to the mail client device. In this way, the mail client device and the IM client device of each group member display the discussion group based on the group creating notification message. Since both the mail client device and the IM client device display the discussion group based on the group creating notification message sent by the IM server, the mail client device and the IM client device essentially display the same discussion group.

In an embodiment, after the group creating notification message is sent to the IM client device of the group member, the method according to an embodiment of the present disclosure further includes: receiving discussion information of the discussion group on the IM client device; and sending the discussion information to the mail client device. In this way, the discussion information presented in the discussion group on the IM client device is presented synchronously in the discussion group on the mail client device, thereby realizing consistency of display of the discussion information.

In an embodiment, after the group creating notification message is sent to the IM client device of the group member, the method according to an embodiment of the present disclosure further includes: receiving discussion information of the discussion group from the mail client device; and sending the discussion information to the IM client device. In this way, the discussion information presented in the discussion group on the mail client device is presented synchronously in the discussion group on the IM client device, thereby realizing consistency of display of the discussion information.

The sharer or the shared member may discuss in the discussion group displayed on the IM client device or in the discussion group displayed on the mail client device. On the one hand, when the sharer or the shared member discusses in the discussion group displayed on the IM client device, the IM server first receives discussion information in the discussion group from the IM client device. For example, when the group members discuss a modification scheme of the shared target email in a form of voice or text, the discussion information in the discussion group may be voice information or text information. In this embodiment, a manner in which the sharer or the shared member discusses in the discussion group through the IM client device is not limited. Then, the IM server sends acquired discussion information to the mail client device through a gateway, so that the discussion information presented in the discussion group on the IM client device is presented synchronously in the discussion group on the mail client device. On the other hand, when the sharer or the shared member discusses in the discussion group displayed on the mail client device, the IM server receives the discussion information in the discussion group from the mail client device through a gateway and sends the discussion information to the IM client device, so that the discussion information presented in the discussion group on the mail client device is presented synchronously in the discussion group on the IM client device. In this way, consistency of discussion information in the discussion groups displayed on the mail client device and the IM client device is realized.

For example, a sharer, Zhang San, of the discussion group sends a discussion message "please modify communication minutes of the scheme" in a discussion group on an IM client device. The discussion message is presented in the discussion group on the IM client device. An IM server receives the discussion message from the IM client device and sends the discussion message to a mail client device through a gateway. In this way, the discussion information "please modify communication minutes of the scheme" is presented in the discussion group displayed on the mail client device. In an embodiment, the discussion information is presented in discussion group on mail client device of each group member, so that the group member views, on the mail client device, the discussion information in the discussion group on the IM client device in time, and participates in the discussion in time.

Based on the above example, the discussion message "please modify communication minutes of the scheme" sent by Zhang San in the discussion group is seen by a shared member, Wang Wu. Then, Wang Wu may reply with a discussion message "the subject of the communication minutes is required to be modified" in the discussion group displayed on a mail client device of Wang Wu. The replied discussion information is presented in the discussion group displayed on the mail client device. The IM server receives the replied discussion information from the mail client device through the gateway and sends the replied discussion information to the IM client device, so that the replied discussion information "the subject of the communication minutes is required to be modified" is presented in the discussion groups displayed on the IM client device. In an embodiment, the replied discussion information is presented in the discussion group on the IM client device of each group member. In this way, the group member views, on the IM client device, the discussion information which is displayed in the discussion group on the mail client device in time, and participates in the discussion in time.

It should be noted that in this embodiment, the IM server may communicate with the mail client device and the IM client device through wireless transmission. The wireless transmission includes Bluetooth transmission, wireless fidelity (WiFi) transmission or microwave transmission. The transmission way, by which the IM server is capable of sending the discussion information in the discussion group displayed on the IM client device to the discussion groups displayed on the mail client device or the IM server is capable of sending the discussion information in the discussion group displayed on the mail client device to the discussion groups displayed on the IM client device, is within the protection scope of the present disclosure, which will not be limited in the embodiments of the present disclosure.

In an embodiment, the method according to this embodiment of the present disclosure further includes: receiving an editing content message from the mail server, where the editing content message is sent from a document server to the mail server after the document server edits a shared document corresponding to a target email based on a mail editing instruction sent by the mail client device of the group member; and sending the editing content message to the discussion group on the IM client device for display.

It should be noted that the editing content message in this embodiment may be an underlining and comment content message. When the sharer or the shared member edits the target email through interaction between the mail client device and the document server, the document server sends the editing content message to the mail server, and the mail server sends the editing content message to the IM server. After receiving the editing content message from the mail server, the IM server sends the editing content message to the discussion groups on the IM client device for display. It should be noted that this embodiment is described only by taking the underlining and comment content message as an example, and a form of the editing content message is not limited in this embodiment.

In an embodiment, the sharer edits the target email on the mail client device in conjunction with the shared member. For example, a shared member, Wang San, sends, to the document server through the mail client device, a mail editing instruction of adding an underlining and comment "please reduce the number of words of the subject" at the email subject. The document server underlines words and adds a comment "please reduce the number of words of the subject" at a position of the subject of the shared document mail corresponding to the target email based on the email editing instruction, to obtain the underlining and comment content message; and sends the underlining and comment content message to the mail server. The mail server sends the underlining and comment content message to the IM server. After receiving the underlining and comment content message from the mail server, the IM server sends the underlining and comment content message to the discussion groups on the IM client device for display. Specifically, the underlining and comment content message may be presented on the discussion interfaces of the discussion groups, and identification information of the commentator is also presented. The commentator may be the sharer or the shared member. A manner in which the underlining and comment content message is presented will not be limited in this embodiment of the present disclosure, and the manner is within the protection scope of the present disclosure as long as the each group member in the discussion group is informed of the underlining and comment content message.

An information interaction method is provided according to the embodiment of the present disclosure. The exchange and integration of information in different servers are realized through the cooperative work of the IM server and the mail server, improving the information processing efficiency and meeting the office requirements of users.

Second Embodiment

Figure 2:
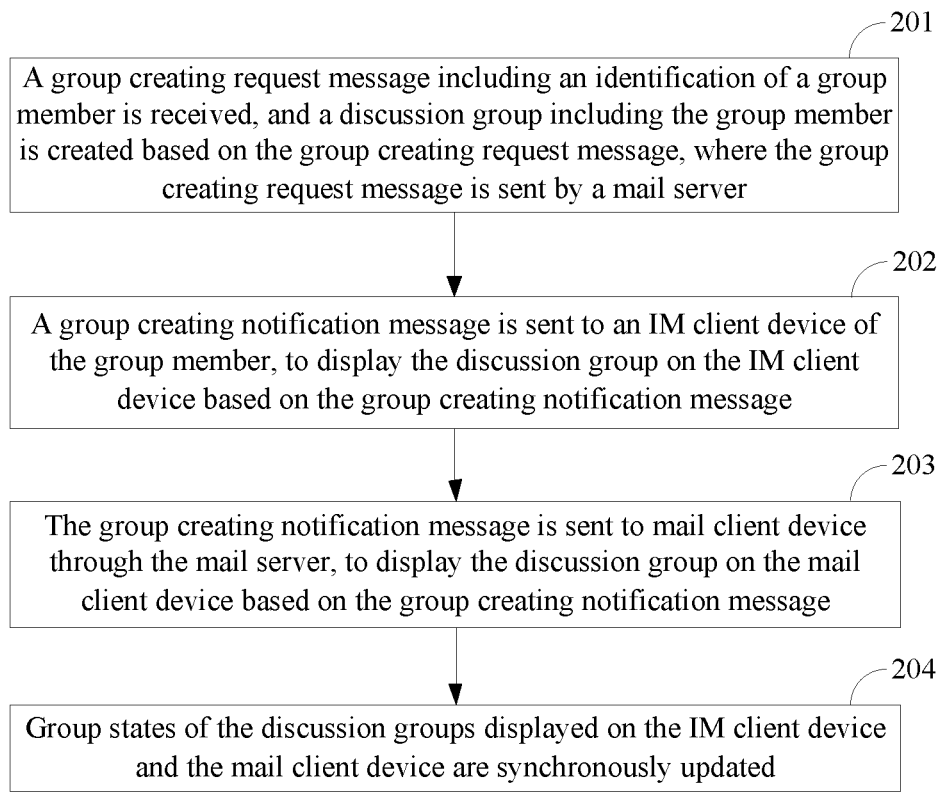
FIG. 2 is a flowchart of an information interaction method according to a second embodiment of the present disclosure.

FIG. 2 is a flowchart of an information interaction method according to a second embodiment of the present disclosure. This embodiment of the present disclosure may be combined with the solutions in the above embodiment. After the group creating notification message is sent to the IM client device to display the discussion group on the IM client device based on the group creating notification message and the group creating notification message is sent to the mail client device through the mail server to display the discussion group on the mail client device based on the group creating notification message in the first embodiment, the method according to this embodiment of the present disclosure further includes: synchronously updating a group state of the discussion group displayed on the IM client device and the mail client device.

As shown in FIG. 2, the method according to an embodiment of the present disclosure includes the following steps 201 to 204.

In step 201, a group creating request message including an identification of a group member is received, and a discussion group including the group member is created based on the group creating request message. The group creating request message is sent by a mail server.

In an embodiment, the group member may include a sharer and a shared member of the target email. The "a discussion group including the group member is created based on the group creating request message" in the step S201 is performed by: creating a discussion group including the sharer and the shared member based on the group creating request message.

In an embodiment, the group creating request message is generated through the mail server by: receiving a sharing instruction, where the sharing instruction is generated by a mail client device of the sharer based on the target email, and the sharing instruction includes the identification of the group member; and generating the group creating request message based on the sharing instruction.

In step 202, a group creating notification message is sent to IM client device of the group member, to display the discussion group on the IM client device based on the group creating notification message.

In step 203, the group creating notification message is sent to mail client device through the mail server, to display the discussion group on the mail client device based on the group creating notification message.

In an embodiment, after the group creating notification message is sent to the IM client device of the group member, the method further includes: receiving discussion information of the discussion group on the IM client device; and sending the discussion information to the mail client device. In this way, the discussion information presented in the discussion group on the IM client device is presented synchronously in the discussion group on the mail client device.

In an embodiment, after the group creating notification message is sent to the IM client device of the group member, the method further includes: receiving discussion information of the discussion group on the mail client device; and sending the discussion information to the IM client device. In this way, the discussion information presented in the discussion group on the mail client device is presented synchronously in the discussion group on the IM client device.

In step 204, group states of the discussion groups displayed on the IM client device and the mail client device are synchronously updated.

In an embodiment, the method according to an embodiment of the present disclosure further includes: receiving a discussion group state update message from the mail client device; and sending the discussion group state update message to the IM client device. In this way, the IM client device update states of the displayed discussion groups based on the discussion group state update message.

In an embodiment, the method according to an embodiment of the present disclosure further includes: receiving a discussion group state update message from the IM client device; and sending the discussion group state update message to the mail client device. In this way, the mail client device updates a state of the displayed discussion group based on the discussion group state update message.

In an embodiment, the discussion group state update message includes at least one of: a group member update message, dissolution of the discussion group, updated discussion information in the discussion group, and update of a reading status of the discussion information in the discussion group.

It should be noted that in this embodiment, the discussion group displayed on the mail client device and the discussion group displayed on the IM client device synchronize not only discussion information, but also the discussion group state update message, so as to realize consistency of the group states of the discussion groups displayed on the mail client device and the IM client device.

The state update of the discussion group involves two aspects. On the one hand, when an IM client device detects that the state of the discussion group changes in response to a trigger operation of the sharer or the shared member on the displayed discussion group, the IM client device may generate a discussion group state update message and sends the discussion group state update message to the IM server. After receiving the discussion group state update message from the IM client device, the IM server sends the discussion group state update message to the mail client device. The mail client device updates the state of the discussion group displayed on the mail client device based on the discussion group state update message. On the other hand, when a mail client device detects that the state of the discussion group changes in response to a trigger operation of the sharer or the shared member on the displayed discussion group, the mail client device generates a discussion group state update message and sends the discussion group state update message to the IM server. After receiving the discussion group state update message from the mail client device, the IM server sends the discussion group state update message to the IM client device. The IM client device updates the state of the discussion group displayed on the IM client device based on the discussion group state update message.

For example, when a group member Zhang San withdraws from a discussion group displayed on an IM client device, the IM client device generates a discussion group state update message "the group member Zhang San has withdrawn from the group" when detecting that Zhang San withdraws from the discussion group; and sends the discussion group state update message to the IM server. The IM server sends the discussion group state update message "the group member Zhang San has withdrawn from the group" to a mail client device. The mail client device updates the state of the discussion group displayed on the mail client device, based on "the group member Zhang San has withdrawn from the group". That is, identity of Zhang San, such as the name or the avatar of Zhang San, is no longer displayed. In this way, when the state of the discussion group on the IM client device changes, the state of the discussion group displayed on the mail client device are synchronously updated in time. This embodiment is described only by taking synchronization of group member update message as an example. The synchronizing process of other types of discussion group state update message is similar to that described in this embodiment, which will not be repeated in this embodiment.

In an embodiment, after the discussion group state update message is received from the IM client device, the method according to an embodiment of the present disclosure may further includes: adding the group member update message to a message queue, where the group member update message includes withdrawing of an existing group member and/or an addition of a new group member; receiving a group member state acquisition instruction from the mail server; sending the group member update message to the mail server based on the group member state acquisition instruction. The mail server updates a target email collaborator list based on the group member update message. In this implementation, by sending the group member update message to the mail server, the mail server accurately updates the target email collaborator list based on the group member update message.

The group member state acquisition instruction is generated when the mail server monitors that a group member update message is added to the message queue of the IM server.

It is determined that the discussion group state update message includes the group member update message, that is, there is a change in the group member, for example, withdrawing of an existing group member and/or addition of a new group member. In this case, the IM server adds the acquired group member update message to the message queue for saving. Since the mail server monitors the message queue of the IM server, the mail server generates a group member state acquisition instruction when monitoring that the group member update message is added to the message queue, and sends the group member state acquisition instruction to the IM server. The IM server receives the group member state acquisition instruction from the mail server; and then sends to the mail server the group member update message newly added to the message queue, based on the received instruction.

In this embodiment, the mail server may be set to: regularly monitor the message queue, generate the group member state acquisition instruction when an update in the message queue is determined, and sends the group member state acquisition instruction to the IM server. In this way, power consumption of the mail server is saved. In this embodiment, a manner in which the IM server receives the group member state acquisition instruction is not limited.

It should be noted that after receiving the group member update message, the mail server further updates the saved target email collaborator list based on the group member state update message. The target email collaborator list includes a group member having a processing permission of the target email. Different group members may have the same or different processing permissions. In this embodiment, the type of processing permission of the group member is not limited.

It should be noted that the mail server may further send a list update prompt to the mail client device based on the group member update message; and update, after receiving an update determination instruction from the mail client, the target email collaborator list based on the group member state update message. Therefore, a manner of updating the target email collaborator list is not limited in this embodiment.

In an embodiment, after the mail server sends the group creating notification message to the mail client device, the method according to an embodiment of the present disclosure further includes: receiving a group member addition request message including an identification of a new member from the mail server; adding the new member to the discussion group based on the group member addition request message. In this implementation, the IM server may also add the new member to the discussion group through the mail server, which reflects diversity of addition of a group member.

In an embodiment, the group member addition request message is sent when the mail server shares the target email with the new member.

In this embodiment, the new member may be added directly through an addition button displayed in the interface of the discussion group. Alternatively, the new member may be added to the discussion group, based on the group member addition request message which includes the identification of the new member and is sent by the mail server. That is, the new member is added to the discussion group indirectly through the mail server. Since the group member addition request message is sent when the mail server shares the target email with the new member, this manner is roughly the same as the manner that the group is created through the target email collaborator list when the target email is first shared.

An information interaction method is provided according to the embodiments of the present disclosure. The exchange and integration of information in different servers are realized through the cooperative work of the IM server and the mail server, improving the information processing efficiency and meeting the office requirements of users. In addition, when the state of the discussion group displayed on one of the IM client device and the mail client device changes, the state of the discussion group displayed on the other one of the IM client device and the mail client device is updated synchronously, ensuring the consistency of the states of the discussion groups.

Third Embodiment

Figure 3:
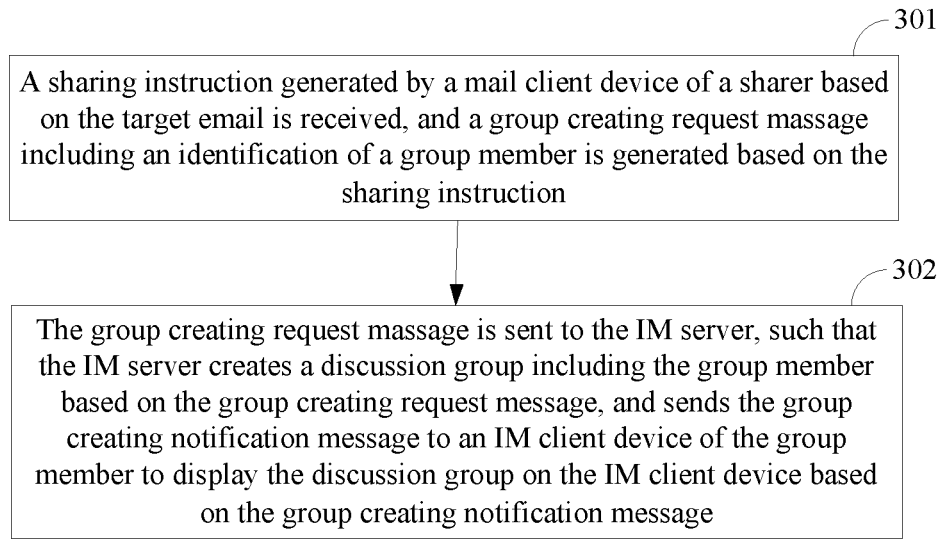
FIG. 3 is a flowchart of an information interaction method according to a third embodiment of the present disclosure.

FIG. 3 is a flowchart of an information interaction method according to a third embodiment of the present disclosure. This embodiment of the present disclosure is applied to a case where an IM server cooperates with a mail server. The method may be performed by the information interaction apparatus according to the embodiments of the present disclosure. The apparatus may be implemented in a form of software and/or hardware and may generally be integrated in a computer device.

As shown in FIG. 3, the method according to an embodiment of the present disclosure includes the following steps 301 and 302.

In step 301, a sharing instruction generated by a mail client device of a sharer based on the target email is received, and a group creating request massage including an identification of a group member is generated based on the sharing instruction.

This embodiment is mainly applied to an information interaction process between the mail server and the IM server. The group creating request message received by the mail server is generated based on the sharing instruction sent by the mail client device.

In an embodiment, the identification of the group member included in the sharing instruction may be a name of the group member or an avatar of the group member. The type of the identification is not limited in this embodiment. As long as the group members can be identified through the identifications, the type of the identifications is within the protection scope of the present disclosure. The mail server receives the sharing instruction, where the sharing instruction is generated by the mail client device of the sharer in the group member based on the target email, and the sharing instruction may include the identification information of the target email and the identification of the group member. In addition, the mail server generates the group creating request message based on the sharing instruction. The group creating request message includes the identification of the group member and a group identification.

In step 302, the group creating request massage is sent to the IM server, such that the IM server creates a discussion group including the group member based on the group creating request message, and sends the group creating notification message to an IM client device of the group member to display the discussion group on the IM client device based on the group creating notification message.

The mail server sends the group creating request massage to the IM server. The IM server creates the discussion group based on the group creating request message, so that all group members in the discussion group may view the target email, and discuss the target email shared by the sharer in the created discussion group. Therefore, the discussion group in this embodiment is created based on a scenario of sharing the target email. In addition, the IM server sends a group creating notification message to the client device and the mail server of the group member. In this way, on the one hand, the IM client device display the discussion group based on the group creating notification message. On the other hand, the mail server, after receiving the group creating notification message from the IM server, creates a discussion group including the group member at the mail client device based on the group creating notification message. Therefore, the discussion group created by the IM server is displayed on the mail client device and the IM client device.

It should be noted that since the discussion group on the mail client device and the discussion group on the IM client device are displayed based on the same group creating notification message, the discussion message and the group state update message in the discussion group displayed on the mail client device are consistent those on the IM client device. Reference may be made to the first embodiment and the second embodiment, which is not repeated in this embodiment.

In an embodiment, after the group creating request message is sent to the IM server, the method according to an embodiment of the present disclosure further includes: monitoring a message queue of the IM server; generating a group member state acquisition instruction when it is determined that a group member update message is added to the message queue; sending the group member state acquisition instruction to the IM server; receiving the group member update message, where the group member update message is sent by the IM server based on the group member state acquisition instruction; and updating a target email collaborator list based on the group member update message.

It should be noted that in this embodiment, the mail server may be set to: regularly monitor the message queue, generate the group member state acquisition instruction when an update in the message queue is determined, and send the group member state acquisition instruction to the IM server. In this way, power consumption of the mail server is saved. In this embodiment, a manner in which the mail server sends the group member state acquisition instruction is not limited.

In an embodiment, after the target email collaborator list is updated based on the group member update message, the method according to an embodiment of the present disclosure further includes: assigning a processing permission of the target email to a new member and canceling a processing permission of the target email enjoyed by a member withdrawing from the group, based on the updated target email collaborator list. In this implementation, the mail server may adjust the processing permission of the target email for the group member based on the updated target email collaborator list. In this way, the processing permission for the group member can be adjusted flexibly.

After receiving the group member update message, the mail server updates the saved target email collaborator list based on the group member state update message. The target email collaborator list includes a group member having the processing permission of the target email. Different group members may have the same or different processing permissions. In this embodiment, the type of processing permission of the group member is not limited. The mail server may assign the permission based on a user instruction. Since a principle of assigning the permission by the mail server is not the focus of the present disclosure, the principle is not described in the present embodiment.

It should be noted that the mail server may further send a list update prompt to the mail client device based on the group member update message, and update, after receiving an update determination instruction from the mail client device, the target email collaborator list based on the group member state update message. Therefore, a manner of updating the target email collaborator list is not limited in this embodiment.

In an embodiment, after the group creating request message is sent to the IM server, the method according to an embodiment of the present disclosure further includes: receiving a group member addition request message including an identification of a group member from the mail client device; and sending the group member addition request message to the IM server. Then, the IM server adds a new member to the discussion group based on the group member addition request message.

In this embodiment, the new member may be added directly through an addition button displayed in the interface of the discussion group. Alternatively, the group member addition request message including an identification of the group member is received from the mail client device first, and then the addition request message is sent to the IM server, such that the IM server add the new member to the discussion group based on the group member addition request message.

An information interaction method is provided according to the embodiments of the present disclosure. The exchange and integration of information in different servers are realized through the cooperative work of the IM server and the mail server, improving the information processing efficiency and meeting the office requirements of users.

Fourth Embodiment

Figure 4:
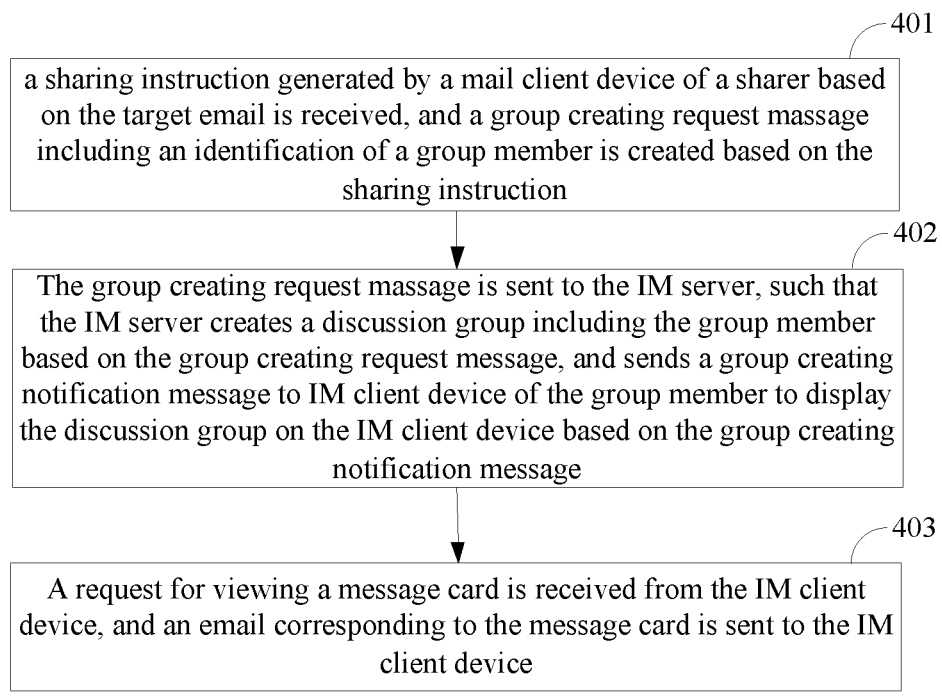
FIG. 4 is a flowchart of an information interaction method according to a fourth embodiment of the present disclosure.

FIG. 4 is a flowchart of an information interaction method according to a fourth embodiment of the present disclosure. This embodiment may be combined with the solutions in the above embodiments. After the group creating request message is sent to the IM server and the IM server creates the discussion group including the group member based on the group creating request message in the third embodiment, the method according to the fourth embodiment further includes: receiving, from the IM client device, a request for viewing a message card, and sending an email corresponding to the message card to the IM client device.

In step 401, a sharing instruction generated by a mail client device of a sharer based on the target email is received, and a group creating request massage including an identification of a group member is created based on the sharing instruction.

In step 402, the group creating request massage is sent to the IM server, such that the IM server creates a discussion group including the group member based on the group creating request message, and sends a group creating notification message to an IM client device of the group member to display the discussion group on the IM client device based on the group creating notification message.

In an embodiment, after the group creating request message is sent to the IM server, the method according to an embodiment of the present disclosure further includes: monitoring a message queue of the IM server; generating a group member state acquisition instruction when it is determined that a group member update message is added to the message queue; sending the group member state acquisition instruction to the IM server; receiving the group member update message, where the group member update message is sent by the IM server based on the group member state acquisition instruction; and updating a target email collaborator list based on the group member update message.

In an embodiment, after the target email collaborator list is updated based on the group member update message, the method according to an embodiment of the present disclosure further includes: assigning a processing permission of the target email to the new member and canceling a processing permission of the target email enjoyed by a member withdrawing from the group based on the updated target email collaborator list.

In an embodiment, after the group creating request message is sent to the IM server, the method according to an embodiment of the present disclosure further includes: receiving a group member addition request message including an identification of a group member from the mail client device; and sending the group member addition request message to the IM server. Then the IM server adds a new member to the discussion group based on the group member addition request message.

In step 403, a request for viewing a message card is received from the IM client device, and an email corresponding to the message card is sent to the IM client device.

In an embodiment, the request for viewing the message card is received from the IM client device first. An email corresponding to the message card is determined based on the request for viewing the message card. Then the determined email is sent to the IM client device, to display a content of the email on the IM client device.

The IM client device may send the request for viewing the message card through a gateway, and receive the determined email through the gateway. In this way, the IM client device displays the content of the mail. A transmission mode between the mail server and the IM client device is not limited in this embodiment. The transmission mode in which the request for viewing the message card and the content of the mail can be transmitted between the mail server and the IM client device is within the protection scope of the present disclosure, and the transmission mode will not be described in this embodiment of the present disclosure.

When detecting a trigger operation on a message card presented in the discussion group, the IM client device sends a request for viewing the message card to the mail server through the gateway. The request for viewing the message card includes mail identification information. Thus, after receiving the request for viewing the message card from the IM client device, the mail server determines an email corresponding to the message card by querying a database based on the mail identification information in the request for viewing the message card; and sends the determined mail to the IM client device through the gateway. Thus, the IM client device displays the content of the email for the group member to view.

An information interaction method is provided according to the embodiments of the present disclosure. The exchange and integration of information in different servers are realized through the cooperative work of the IM server and the mail server, improving the information processing efficiency and meeting the office requirements of users. In addition, the mail server receives the request for viewing the message card from the IM client device, and the email corresponding to the message card is displayed on the discussion group, thereby further meeting the office requirements of the users.

Fifth Embodiment

Figure 5:
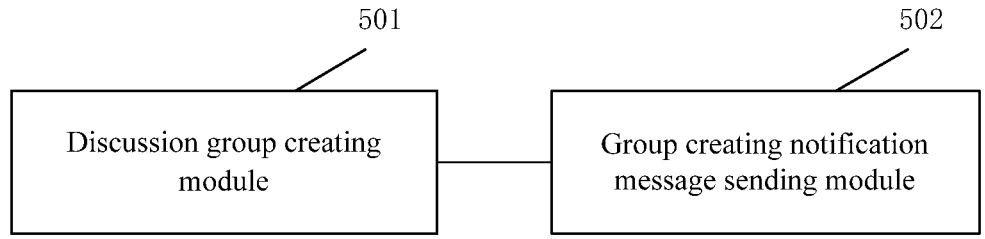
FIG. 5 is a schematic structural diagram of an information interaction apparatus according to a fifth embodiment of the present disclosure.

FIG. 5 is a schematic structural diagram of an information interaction apparatus according to a fifth embodiment of the present disclosure. The apparatus may be implemented in a form of software and/or hardware, and may generally be integrated in an IM server for performing a method. As shown in FIG. 5, the apparatus may include a discussion group creating module 501 and a group creating notification message sending module 502.

The discussion group creating module 501 is configured to receive a group creating request message including an identification of a group member, and create a discussion group including the group member based on the group creating request message. The group creating request message is sent by a mail server.

The group creating notification message sending module 502 is configured to send a group creating notification message to an IM client device of the group member, to display the discussion group on the IM client device based on the group creating notification message.

In an embodiment, the apparatus further includes a group creating notification message sending module.

The group creating notification message sending module is configured to send the group creating notification message to mail client device through the mail server, to display the discussion group on the mail client device based on the group creating notification message.

In an embodiment, the apparatus further includes an IM client discussion information transmission module.

The IM client discussion information transmission module is configured to receive discussion information of the discussion group on the IM client device; and send the discussion information to the mail client device, such that the discussion information in the discussion group on the IM client device is displayed synchronously in the discussion group on the mail client device.

In an embodiment, the apparatus further includes a mail client discussion group state update message transmission module.

The mail client discussion group state update message transmission module is configured to receive a discussion group state update message from the mail client device; and send the discussion group state update message to the IM client device, such that the IM client device update a state of the discussion group displayed on the IM client device based on the discussion group state update message.

In an embodiment, the apparatus further includes an IM client discussion group state update message transmission module.

The IM client discussion group state update message transmission module is configured to receive a discussion group state update message from the IM client device; and send the discussion group state update message to the mail client device, such that the mail client device updates a state of the discussion group displayed on the mail client device based on the discussion group state update message.

In an embodiment, the discussion group state update message includes at least one of: a group member update message, dissolution of the discussion group, update of discussion information in the discussion group and update of a reading status of the discussion information in the discussion group.

In an embodiment, the apparatus further includes a group member state transmission module.

The group member state transmission module is configured to add the group member update message to a message queue, where the group member update message includes withdrawing of an existing group member and/or an addition of a new group member; receive a group member state acquisition instruction from the mail server; send the group member update message to the mail server based on the group member state acquisition instruction, such that the mail server updates a target email collaborator list based on the group member update message.

In an embodiment, the group member state acquisition instruction is generated when the mail server monitors that the group member update message is added to the message queue of the IM server.

In an embodiment, the apparatus further includes a new member addition module.

The new member addition module is configured to receive a group member addition request message including an identification of a new member from the mail server; and add the new member to the discussion group based on the group member addition request message.

In an embodiment, the group member addition request message is sent when the mail server shares the target email with the new member.

In an embodiment, the apparatus further includes an editing content message transmission module.

The editing content message transmission module is configured to receive an editing content message from the mail server, where the editing content message is sent from a document server to the mail server after the document server edits a shared document corresponding to the target email based on a mail editing instruction sent by the mail client device of a group member; and send the editing content message to the discussion group on the IM client device for display.

The information interaction apparatus according to the embodiments of the present disclosure has the same inventive concept as the information interaction method according to the above embodiments. For the technical details not described in detail in this embodiment of the present disclosure, one may refer to the above embodiments, and this embodiment of the present disclosure has the same beneficial effect as the above embodiments.

Sixth Embodiment

Figure 6:
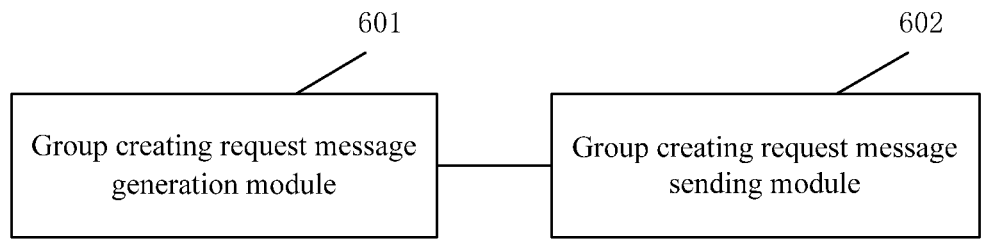
FIG. 6 is a schematic structural diagram of an information interaction apparatus according to a sixth embodiment of the present disclosure.

FIG. 6 is a schematic structural diagram of an information interaction apparatus according to a sixth embodiment of the present disclosure. The apparatus may be implemented in a form of software and/or hardware, and may generally be integrated in a document server for performing a method. As shown in FIG. 6, the apparatus may include a group creating request message generation module 601 and a group creating request message sending module 602.

The group creating request message generation module 601 is configured to receive a sharing instruction, where the sharing instruction is generated by a mail client device of a sharer based on the target email; and generate a group creating request massage including an identification of a group member based on the sharing instruction.

The group creating request message sending module 602 is configured to send the group creating request massage to the IM server, such that the IM server creates a discussion group including the group member based on the group creating request message and sends a group creating notification message to an IM client device of the group member, to display the discussion group on the IM client device based on the group creating notification message.

In an embodiment, the apparatus further includes a collaborator list update module.

The collaborator list update module is configured to monitor a message queue of the IM server; generate a group member state acquisition instruction when it is determined that a group member update message is added to the message queue; send the group member state acquisition instruction to the IM server; receive the group member update message, where the group member update message is sent by the IM server based on the group member state acquisition instruction; and update a target email collaborator list based on the group member update message.

In an embodiment, the apparatus further includes a processing permission adjustment module.

The processing permission adjustment module is configured to assign a processing permission of the target email to a new member and cancel a processing permission of the target email enjoyed by a member withdrawing from the group, based on the updated target email collaborator list.

In an embodiment, the apparatus further includes a group member addition request message acquisition module.

The group member addition request message acquisition module is configured to receive a group member addition request message including an identification of a group member from the mail client device; and send the group member addition request message to the IM server, such that the IM server adds the new member to the discussion group based on the group member addition request message.

In an embodiment, the apparatus further includes a mail content display module.

The mail content display module is configured to receive a request for viewing a message card from the IM client device; determine an email corresponding to the message card based on the request for viewing the message card; and send the determined email to the IM client device, to display a content of the email on the IM client device.

The information interaction apparatus according to the embodiments of the present disclosure has the same inventive concept as the information interaction method according to the above embodiments. For the technical details not described in detail in this embodiment of the present disclosure, one may refer to the above embodiments, and this embodiment of the present disclosure has the same beneficial effect as the above embodiments.

Seventh Embodiment

Figure 7:
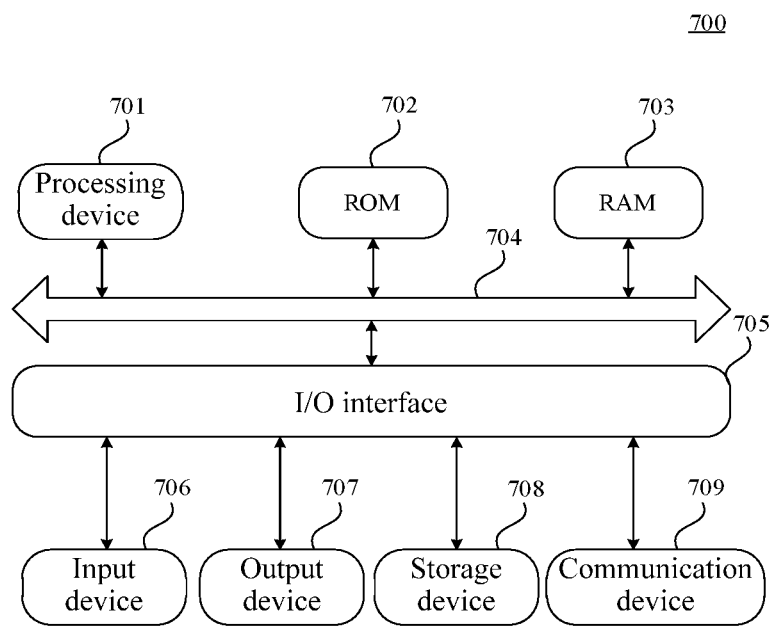
FIG. 7 is a schematic structural diagram of an IM server according to a seventh embodiment of the present disclosure.

Reference is made to FIG. 7, which is a schematic structural diagram of an IM server 700 applicable to implement the embodiments of the present disclosure. The IM server according to an embodiment of the present disclosure may be a device corresponding to a back-end service platform of an application program, or a mobile terminal device installed with an application program client. Specifically, the IM server may include, but is not limited to: a mobile terminal such as a mobile phone, a notebook computer, a digital broadcast receiver, a PDA (personal digital assistant), a PAD (tablet computer), a PMP (portable multimedia player), an on-board terminal (for example, an on-board navigation terminal) and a fixed terminal such as a digital TV and a desktop computer. The IM server shown in FIG. 7 is only an example and should not bring any restrictions on the function and the usage scope of the embodiments of the present disclosure.

As shown in FIG. 7, the IM server 700 may include a processing device 701 (for example, a central processing unit, a graphics processor, and the like), which may perform various appropriate actions and processes based on a program stored in a read only memory (ROM) 702 or a program loaded from a storage device 708 to a random access memory (RAM) 703. The RAM 703 further stores various programs and data required for operations of the IM server 700. The processing device 701, the ROM 702 and the RAM 703 are connected to each other through a bus 704. An input/output (I/O) interface 705 is also connected to the bus 704.

Generally, the following apparatus may be connected to the I/O interface 705: an input device 706 such as a touch screen, a touch pad, a keyboard, a mouse, a camera, a microphone, an accelerometer, and a gyroscope; an output device 707 such as a liquid crystal display (LCD), a speaker, and a vibrator; a storage device 708 such as a magnetic tape and a hard disk; and a communication device 709. The communication device 709 allows the IM server 700 to communicate wirelessly or wirelessly with other devices to exchange data. Although FIG. 7 shows the IM server 700 including various apparatus, it should be understood that it is not required to implement or provide all the devices shown in FIG. 7, and more or fewer apparatus may be implemented or provided.

In particular, according to the embodiments of the present disclosure, the process described above with reference to the flowchart may be implemented as a computer software program. For example, a computer program product is provided according to an embodiment of the present disclosure. The computer program product includes a computer program carried on a non-transitory computer-readable medium. The computer program includes program codes for executing the method shown in the flowchart. In such an embodiment, the computer program may be downloaded and installed from the network through the communication device 709, or installed from the storage device 708, or installed from the ROM 702. When the computer program is executed by the processing device 701, the functions defined in the method according to the embodiments of the present disclosure are performed It should be noted that the above computer-readable medium according to the present disclosure may be a computer-readable signal medium or a computer-readable storage medium, or a combination thereof. The computer-readable storage medium, for example, may be but is not limited to: an electrical, magnetic, optical, electromagnetic, infrared, or semiconductor system, apparatus, or device, or any combination thereof. Specifically, the computer-readable storage medium may include but is not limited to: an electrical connection with one or more wires, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination thereof. In the present disclosure, the computer-readable storage medium may be any tangible medium including or storing a program, which may be used by or in combination with an instruction execution system, an apparatus or a device. In the present disclosure, the computer-readable signal medium may include a data signal propagated in a baseband or as a part of a carrier wave. The data signal carries computer-readable program codes. The transmitted data signal may be in various forms, and includes but is not limited to an electromagnetic signal, an optical signal or any suitable combination thereof. The computer-readable signal medium may also be any computer-readable medium other than the computer-readable storage medium. The computer-readable signal medium may transmit, propagate, or transmit a program used by or in combination with an instruction execution system, an apparatus, or a device. The program codes included in the computer-readable medium may be transmitted by any suitable medium. The suitable medium includes but is not limited to: a wire, an optical cable, an RF (radio frequency), or any suitable combination thereof.

In some embodiments, the client device and the server may communicate with each other in any currently known network protocol such as HTTP (Hypertext Transfer Protocol) or a future developed network protocol, and may be interconnected with digital data communication (for example, a communication network) in any forms or medium. An example of the communication network includes a local area network ("LAN"), a wide area network ("WAN"), an internet (for example, the Internet), an end-to-end network (for example, an ad hoc end-to-end network), and any currently known or future developed network.

Eighth Embodiment

Figure 8:
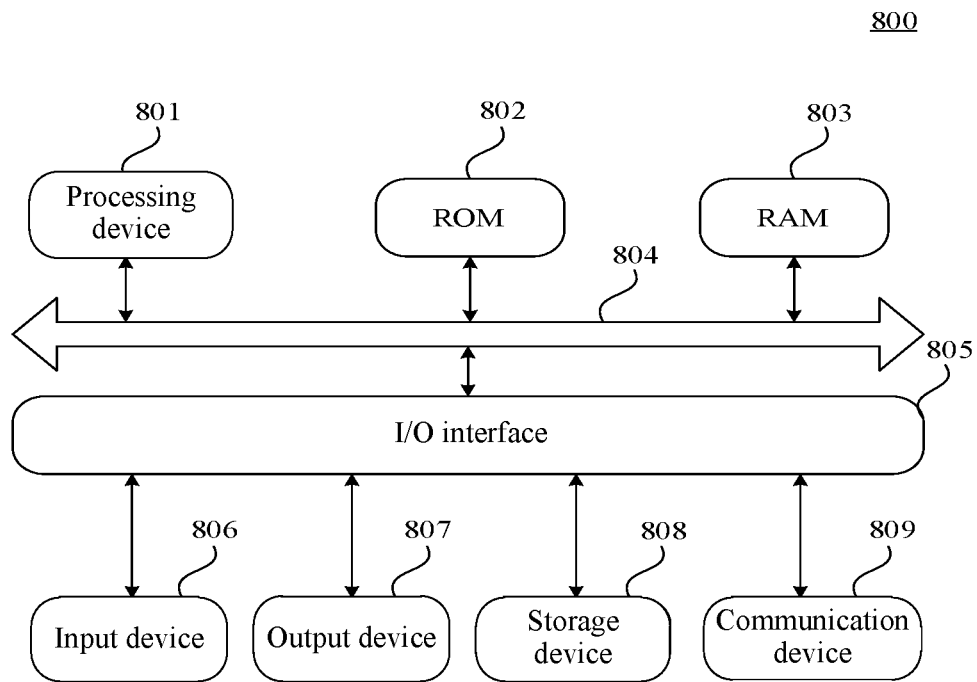
FIG. 8 is a schematic structural diagram of a mail server according to an eighth embodiment of the present disclosure.

Reference is made to FIG. 8, which is a schematic structural diagram of a mail server 800 applicable to implement the embodiments of the present disclosure. The mail server according to this embodiment of the present disclosure may be a device corresponding to a back-end service platform of an application program, or a mobile terminal device installed with an application program client. Specifically, the IM server may include, but is not limited to: a mobile terminal such as a mobile phone, a notebook computer, a digital broadcast receiver, a PDA (personal digital assistant), a PAD (tablet computer), a PMP (portable multimedia player), an on-board terminal (for example, an on-board navigation terminal) and a fixed terminal such as a digital TV and a desktop computer. The mail server shown in FIG. 8 is only an example and should not bring any restrictions on the function and the usage scope of the embodiments of the present disclosure.

As shown in FIG. 8, the mail server 800 may include a processing device 801 (for example, a central processing unit, a graphics processor, and the like), which may perform various appropriate actions and processes based on a program stored in a read only memory (ROM) 802 or a program loaded from a storage device 808 to a random access memory (RAM) 803. The RAM 803 further stores various programs and data required for operations of the mail server 800. The processing device 801, the ROM 802 and the RAM 803 are connected to each other through a bus 804. An input/output (I/O) interface 805 is also connected to the bus 804.

Generally, the following apparatus may be connected to the I/O interface 805: an input device 806 such as a touch screen, a touch pad, a keyboard, a mouse, a camera, a microphone, an accelerometer, and a gyroscope; an output device 807 such as a liquid crystal display (LCD), a speaker, and a vibrator; a storage device 808 such as a magnetic tape and a hard disk; and a communication device 809. The communication device 809 allows the mail server 800 to communicate wirelessly or wirelessly with other devices to exchange data. Although FIG. 8 shows the mail server 800 including various apparatus, it should be understood that it is not required to implement or provide all the apparatus shown in FIG. 8, and more or fewer apparatus may be implemented or provided.

In particular, according to the embodiments of the present disclosure, the process described above with reference to the flowchart may be implemented as a computer software program. For example, a computer program product is provided according to an embodiment of the present disclosure. The computer program product includes a computer program carried on a non-transitory computer-readable medium. The computer program includes program codes for executing the method shown in the flowchart. In such an embodiment, the computer program may be downloaded and installed from the network through the communication device 809, or installed from the storage device 808, or installed from the ROM 802. When the computer program is executed by the processing device 801, the functions defined in the method according to the embodiments of the present disclosure are performed It should be noted that the above computer-readable medium according to the present disclosure may be a computer-readable signal medium or a computer-readable storage medium, or a combination thereof. The computer-readable storage medium, for example, may be but is not limited to: an electrical, magnetic, optical, electromagnetic, infrared, or semiconductor system, apparatus, or device, or any combination thereof. Specifically, the computer-readable storage medium may include but is not limited to: an electrical connection with one or more wires, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination thereof. In the present disclosure, the computer-readable storage medium may be any tangible medium including or storing a program, which may be used by or in combination with an instruction execution system, an apparatus or a device. In the present disclosure, the computer-readable signal medium may include a data signal propagated in a baseband or as a part of a carrier wave. The data signal carries computer-readable program codes. The transmitted data signal may be in various forms, and includes but is not limited to an electromagnetic signal, an optical signal or any suitable combination thereof. The computer-readable signal medium may also be any computer-readable medium other than the computer-readable storage medium. The computer-readable signal medium may transmit, propagate, or transmit a program used by or in combination with an instruction execution system, an apparatus, or a device. The program codes included in the computer-readable medium may be transmitted by any suitable medium. The suitable medium includes but is not limited to: a wire, an optical cable, an RF (radio frequency), or any suitable combination thereof.

In some embodiments, the client device and the server may communicate with each other in any currently known network protocol such as HTTP (Hypertext Transfer Protocol) or a future developed network protocol, and may be interconnected with digital data communication (for example, a communication network) in any forms or medium. An example of the communication network includes a local area network ("LAN"), a wide area network ("WAN"), an internet (for example, the Internet), an end-to-end network (for example, an ad hoc end-to-end network), and any currently known or future developed network.

Ninth Embodiment

Figure 9:
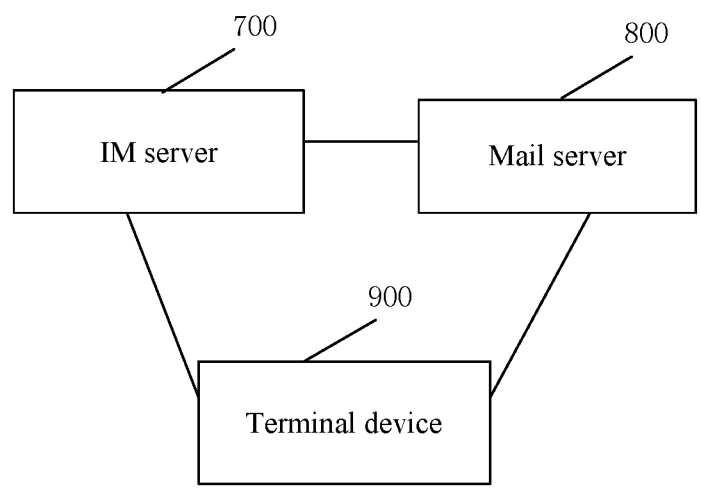
FIG. 9 is a schematic structural diagram of an information interaction system according to a ninth embodiment of the present disclosure.

FIG. 9 is a schematic structural diagram of an information interaction system according to a ninth embodiment of the present disclosure. As shown in FIG. 9, the system includes the IM server 700 and the mail server 800. The structure of the IM server 700 may refer to the seventh embodiment. The structure of the mail server 800 may refer to the eighth embodiment.

The IM server and the mail server according to an embodiment communicate with each other, so as to realize the information interaction methods according to the first embodiment to the fourth embodiment.

It should be noted that the system according to an embodiment further includes a terminal device 900 communicating with the mail server and the IM server. The mail client device and the IM client device may run on the terminal device 900.

Tenth Embodiment

The computer-readable medium may be included in the IM server or the mail server, or exist alone and be not installed in the IM server and the mail server.

The computer-readable medium carries one or more programs. When the one or more programs are executed by the IM server, the IM server receives a group creating request message including an identification of a group member and creates a discussion group including the group member based on the group creating request message, where the group creating request message is sent by the mail server; and sends a group creating notification message to an IM client device of the group member, to display the discussion group on the IM client device based on the group creating notification message.

Alternatively, the computer-readable medium carries one or more programs. When the one or more programs are executed by the mail server, the mail server receives a sharing instruction generated by a mail client device of a sharer based on the target email and generates a group creating request massage including an identification of a group member based on the sharing instruction; and sends the group creating request massage to the IM server, such that the IM server creates a discussion group including the group member based on the group creating request message, and sends the group creating notification message to an IM client device of the group member to display the discussion group on the IM client device based on the group creating notification message.

Computer program codes for performing the operations of the present disclosure may be written in one or more programming languages or a combination thereof. The programming languages include but are not limited to an object-oriented programming language such as Java, Smalltalk, C++, and a conventional procedural programming language such as "C" language or similar programming languages. The program codes may be executed completely on a computer of a user, executed partially on the computer of the user, executed as a separate software package, executed partially on the computer of the user and partially on a remote computer, executed completely on the remote computer or executed completely on a server. In a case that the program codes are executed on the remote computer, the remote computer may be connected to the computer of the user through any network, including a local area network (LAN) and a wide area network (WAN). Alternatively, the remote computer may be connected to an external computer (for example, through the Internet based on an Internet service provider).

The flowcharts and block diagrams in the drawings illustrate possible architectures, functions and operations of the systems, the methods and the computer program products according to the embodiments of the present disclosure. Each block in the flowcharts or the block diagrams may represent a module, a program segment, or a part of codes. The module, the program segment, or the part of codes includes one or more executable instructions for implementing a specified logical function. It should also be noted that in some alternative implementations, functions in the blocks may be implemented a different order than that marked in the drawings. For example, function in two connected blocks may actually be implemented in parallel, or implemented in an opposite order, which depends on the functions. It should also be noted that each block in the block diagrams and/or flowcharts and a combination of blocks in the block diagrams and/or flowcharts may be realized by a special hardware-based system for performing a specified function or operation, or realized by a combination of special hardware and a computer instruction.

The units described in the embodiments of the present disclosure may be implemented in software or hardware. In some cases, a unit is not limited by a name of the unit.

The functions described above in the present disclosure may be at least partially performed by one or more hardware logic units. For example, unrestricted, an exemplary hardware logic component that can be used includes: a field programmable gate array (FPGA), an application specific integrated circuit (ASIC), an application specific standard product (ASSP), a system on chip (SOC), a complex programmable logic device (CPLD), and the like.

In the context of the present disclosure, a machine-readable medium may be a tangible medium. The machine-readable medium may include or store a program for use by or in combination with an instruction execution system, an apparatus, or a device. The machine-readable medium may be a machine-readable signal medium or a machine-readable storage medium. The machine-readable medium may include but is not limited to: an electronic, magnetic, optical, electromagnetic, infrared, or semiconductor system, apparatus or device, or any suitable combination thereof. An example of the machine-readable storage medium includes an electrical connection based on one or more wires, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device or any suitable combination thereof.

An information interaction method according to one or more embodiments of the present disclosure includes:

receiving a group creating request message including an identification of a group member, and creating a discussion group including the group member based on the group creating request message, where the group creating request message is sent by a mail server; and sending a group creating notification message to an IM client device of the group member, to display the discussion group on the IM client device based on the group creating notification message.

According to one or more embodiments of the present disclosure, in the method, the group member includes a sharer and a shared member of a target email.

The creating a discussion group including the group member based on the group creating request message includes: creating a discussion group including the sharer and the shared member based on the group creating request message.

According to one or more embodiments of the present disclosure, in the method, the group creating request message is generated through the mail server by: receiving a sharing instruction, where the sharing instruction is generated by a mail client device of the sharer based on the target email, and the sharing instruction includes the identification of the group member; and generating the group creating request message based on the sharing instruction.

According to one or more embodiments of the present disclosure, in the method, the group member includes a sender, a recipient and a carbon copy person of the target email.

The creating a discussion group including the group member based on the group creating request message includes: creating a discussion group including at least one of the sender, the recipient and the carbon copy person based on the group creating request message.

According to one or more embodiments of the present disclosure, in the method, after the creating a discussion group including the group member based on the group creating request message, the method further includes: sending the group creating notification message to a mail client device through the mail server, to display the discussion group on the mail client device based on the group creating notification message.

According to one or more embodiments of the present disclosure, in the method, after the creating a discussion group including the group member based on the group creating request message, the method further includes: receiving a processing instruction, where the processing instruction is generated by a mail client device of a user based on the target email, and the processing instruction includes an identification of the user; and add the user to the discussion group as a group member based on the identification of the user.

According to one or more embodiments of the present disclosure, in the method, after the sending the group creating notification message to the IM client device of the group member, the method further includes: receiving discussion information of the discussion group on the IM client device; and sending the discussion information to the mail client device, to display the discussion information in the discussion groups on the mail client device and the IM client device synchronously.

According to one or more embodiments of the present disclosure, in the method, after the sending a group creating notification message to an IM client device of the group member, the method further includes: receiving discussion information of the discussion group from the mail client device; and sending the discussion information to the IM client device, to display the discussion information in the discussion groups on the mail client device and the IM client device synchronously.

According to one or more embodiments of the present disclosure, in the method, after the sending the group creating notification message to the mail client device through the mail server, the method further includes: receiving a discussion group state update message from the mail client device; and sending the discussion group state update message to the IM client device, to update a state of the displayed discussion group by the IM client device based on the discussion group state update message.

According to one or more embodiments of the present disclosure, in the method, after the sending a group creating notification message to an IM client device of the group member, the method further includes: receiving a discussion group state update message from the IM client device; and sending the discussion group state update message to the mail client device, to update a state of the displayed discussion group by the mail client device based on the discussion group state update message.

According to one or more embodiments of the present disclosure, in the method, the discussion group state update message includes at least one of: a group member update message, dissolution of the discussion group, update of discussion information in the discussion group and reading the update of the discussion information in the discussion group.

According to one or more embodiments of the present disclosure, in the method, after the receiving the discussion group state update message from the IM client device, the method further includes: adding the group member update message to a message queue, where the group member update message includes withdrawing of an existing group member and/or an addition of a new group member; receiving a group member state acquisition instruction from the mail server; and sending the group member update message to the mail server based on the group member state acquisition instruction, to updates a target email collaborator list by the mail server based on the group member update message.

According to one or more embodiments of the present disclosure, in the method, the group member state acquisition instruction is generated when the mail server monitors that a group member update message is added to the message queue of the IM server.

According to one or more embodiments of the present disclosure, in the method, after the sending the group creating notification message to the mail client device through the mail server, the method further includes: receiving from the mail server a group member addition request message including an identification of a new member; and adding the new member to the discussion group based on the group member addition request message.

According to one or more embodiments of the present disclosure, in the method, the group member addition request message is sent when the mail server shares the target email with the new member.

According to one or more embodiments of the present disclosure, the method further includes: receiving an editing content message from the mail server, where the editing content message is sent from a document server to the mail server after a document server edits a shared document corresponding to the target email based on a mail editing instruction sent by the mail client device of the group member; and sending the editing content message to the discussion group on the IM client device for display.

An information interaction method is provided according to one or more embodiments of the present disclosure. The method includes: receiving a sharing instruction, where the sharing instruction is generated by a mail client device of a sharer based on the target email, and generating a group creating request massage including the identification of group member based on the sharing instruction; and sending the group creating request massage to the IM server, where the IM server creates a discussion group including the group member based on the group creating request message, and sends the group creating notification message to the IM client device of the group member, to display the discussion group on the IM client device based on the group creating notification message.

According to one or more embodiments of the present disclosure, in the method, after the sending the group creating request message to the IM server, the method further includes: monitoring a message queue of the IM server; generating a group member state acquisition instruction when it is determined that a group member update message is added to the message queue; sending the group member state acquisition instruction to the IM server; receiving the group member update message, where the group member update message is sent by the IM server based on the group member state acquisition instruction; and updating a target email collaborator list based on the group member update message.

According to one or more embodiments of the present disclosure, in the method, after the updating a target email collaborator list based on the group member update message, the method further includes: assigning a processing permission of the target email to a new member and canceling a processing permission of the target email enjoyed by a member withdrawing from a group, based on the updated target email collaborator list.

According to one or more embodiments of the present disclosure, in the method, after the sending the group creating request message to the IM server, the method further includes: receiving a group member addition request message including an identification of a group member from a mail client device; and sending the group member addition request message to the IM server, to add a group member to the discussion group by the IM server based on the group member addition request message.

The method according to one or more embodiments of the present disclosure further includes: receiving a request for viewing a message card from the IM client device; determining an email corresponding to the message card based on the request for viewing the message card; and sending the determined email to the IM client device, to display content of the email on the IM client device.

An information interaction apparatus according to one or more embodiments of the present disclosure includes a discussion group creating module and a group creating notification message sending module.

The discussion group creating module is configured to receive a group creating request message including an identification of a group member and create a discussion group including the group member based on the group creating request message, where the group creating request message is sent by a mail server.

The group creating notification message sending module is configured to send a group creating notification message to an IM client device of the group member, to display the discussion group on the IM client device based on the group creating notification message.

According to one or more embodiments of the present disclosure, the group member includes a sharer and a shared member of an email.

When the discussion group including the group member is created based on the group creating request message, the discussion group creating module is configured to: create a discussion group including the sharer and the shared member based on the group creating request message.

According to one or more embodiments of the present disclosure, the group creating request message is generated through the mail server by: receiving a sharing instruction, where the sharing instruction is generated by a mail client device of the sharer based on the target email, and the sharing instruction includes the identification of the group member; and generating the group creating request message based on the sharing instruction.

According to one or more embodiments of the present disclosure, the apparatus further includes a group creating notification message sending module configured to: send the group creating notification message to a mail client device through the mail server, to display the discussion group on the mail client device based on the group creating notification message.

According to one or more embodiments of the present disclosure, the apparatus further includes an IM client discussion information transmission module configured to: receive discussion information of the discussion group on the IM client device; and send the discussion information to the mail client device, to display the discussion information in the discussion groups on both the IM client device and the mail client device synchronously.

According to one or more embodiments of the present disclosure, the apparatus further includes a mail client discussion information transmission module configured to: receive discussion information of the discussion group on the mail client device; and send the discussion information to the IM client device, to display the discussion information in the discussion groups on both the IM client device and the mail client device synchronously.

According to one or more embodiments of the present disclosure, the apparatus further includes a mail client discussion group state update message transmission module configured to: receive a discussion group state update message from the mail client device; and send the discussion group state update message to the IM client device, to update a state of the displayed discussion group by the IM client device based on the discussion group state update message.

According to one or more embodiments of the present disclosure, the apparatus further includes an IM client discussion group state update message transmission module configured to: receive a discussion group state update message from the IM client device; and send the discussion group state update message to the mail client device, to update a state of the displayed discussion group by the mail client device based on the discussion group state update message.

According to one or more embodiments of the present disclosure, the discussion group state update message includes at least one of: a group member update message, dissolution of the discussion group, update of discussion information in the discussion group and update of a reading status of the discussion information in the discussion group.

According to one or more embodiments of the present disclosure, the apparatus further includes a group member state transmission module configured to: add the group member update message to a message queue, where the group member update message includes withdrawing of an existing group member and/or an addition of a new group member; receive a group member state acquisition instruction from the mail server; and send the group member update message to the mail server based on the group member state acquisition instruction, to update a target email collaborator list by the mail server based on the group member update message.

According to one or more embodiments of the present disclosure, the group member state acquisition instruction is generated when the mail server monitors that the group member update message is added to the message queue of the IM server.

According to one or more embodiments of the present disclosure, the apparatus further includes a new member addition module configured to: receive a group member addition request message including an identification of a new member from the mail server; and add the new member to the discussion group based on the group member addition request message.

According to one or more embodiments of the present disclosure, the group member addition request message is sent when the mail server shares the target email with the new member.

According to one or more embodiments of the present disclosure, the apparatus further includes an editing content message transmission module configured to: receive an editing content message from the mail server, where the editing content message is sent from a document server to the mail server after the document server edits a shared document corresponding to the target email based on a mail editing instruction sent by the mail client device of a group member; and send the editing content message to the discussion group on the IM client device for display.

An information interaction apparatus according to one or more embodiments of the present disclosure includes a group creating request message generation module and a group creating request message sending module.

The group creating request message generation module is configured to receive a sharing instruction, where the sharing instruction is generated by a mail client device of a sharer based on a target email; and generate a group creating request massage including an identification of a group member based on the sharing instruction.

The group creating request message sending module is configured to send the group creating request massage to the IM server, wherein the IM server creates a discussion group including the group member based on the group creating request message and sends a group creating notification message to an IM client device of the group member, to display the discussion group on the IM client device based on the group creating notification message.

According to one or more embodiments of the present disclosure, the apparatus further includes a collaborator list update module configured to: monitor a message queue of the IM server, and generate a group member state acquisition instruction when it is determined that a group member update message is added to the message queue; send the group member state acquisition instruction to the IM server; receive the group member update message, where the group member update message is sent by the IM server based on the group member state acquisition instruction; and update a target email collaborator list based on the group member update message.

According to one or more embodiments of the present disclosure, the apparatus further includes a processing permission adjustment module configured to: assign a processing permission of the target email to a new member and cancel a processing permission of the target email enjoyed by a member withdrawing from the group, based on the updated target email collaborator list.

According to one or more embodiments of the present disclosure, the apparatus further includes a group member addition request message acquisition module configured to receive a group member addition request message including the identification of the group member from the mail client device; and send the group member addition request message to the IM server, to add a new member to the discussion group by the IM server based on the group member addition request message.

According to one or more embodiments of the present disclosure, the apparatus further includes a mail content display module configured to receive a request for viewing a message card from the IM client device; determine an email corresponding to the message card based on the request for viewing the message card; and send the determined email to the IM client device, to display content of the email on the IM client device.

An IM server is provided according to one or more embodiments of the present disclosure. The IM server includes: one or more processors; and a storage device configured to store one or more programs that, when being executed by the one or more processors, cause the one or more processors to perform the information interaction method according to the first embodiment and the second embodiment of the present disclosure.

A mail server is according to one or more embodiments of the present disclosure. The mail server includes: one or more processors; and a storage device configured to store one or more programs that, when being executed by the one or more processors, cause the one or more processors to perform the information interaction method according to the third embodiment and the fourth embodiment of the present disclosure.

An information interaction system is provided according to one or more embodiments of the present disclosure. The information interaction system includes: the IM server according to the fourth embodiment and the mail server according to the fifth embodiment.

A computer-readable storage medium is provided according to one or more embodiments of the present disclosure. The computer-readable storage medium stores a computer program that, when being executed by a processor, performs the method according to any embodiment of the present disclosure.

The above only describes preferred embodiments of the present disclosure and applied technical principles. Those skilled in the art should understand that scope of the present disclosure is not limited to the technical solutions formed by combining the above technical features, but covers other technical solutions formed by an arbitrary combination of the above technical features or equivalent features thereof without departing from the concept of the present disclosure, for example, a technical solution formed by replacing the above features with technical features having similar functions disclosed in (but not limited to) the present disclosure.

In addition, although the operations are described in a specific order, it should not be understood that these operations are required to be performed in the specific order shown or in a sequential order. In some scenarios, processing multiple tasks in parallel may be advantageous. Similarly, although several specific implementation details are included in the above discussion, it should not be interpreted as limitation to the scope of the present disclosure. Certain features described in the context of individual embodiments may be implemented in combination in a single embodiment. Conversely, various features described in the context of a single embodiment may be implemented in multiple embodiments individually or in any suitable sub combination.

Although the subject is described in language specific to structural features and/or logical actions of methods, it should be understood that the subject defined in the claims is not limited to the specific features or actions described above. On the contrary, the specific features and actions described above are only exemplary forms of implementing the claims.

The invention claimed is:

1. An information interaction method, comprising:
receiving a group creating request message comprising an identification of a group member, and creating a discussion group comprising the group member based on the group creating request message, wherein the group creating request message is sent by a mail server;
sending a group creating notification message to an IM client device of the group member, to display the discussion group on the IM client device based on the group creating notification message; and
sending the group creating notification message to a mail client device through the mail server, to display the discussion group on the mail client device based on the group creating notification message, wherein the group member in the discussion group on the IM client device is the same as the group member in the discussion group on the mail client device,
wherein the method further comprises:
receiving discussion information from one group member of the discussion group on the IM client device; and sending the discussion information to the mail client device in the discussion group, to synchronously display the discussion information for each group member of the discussion groups on both the mail client device and the IM client device; or
receiving the discussion information from one group member of the discussion group on the mail client device; and sending the discussion information to the IM client device in the discussion group, to synchronously display the discussion information for each group member of the discussion groups on both the mail client device and the IM client device.

2. The method according to claim 1, wherein the group member comprises a sharer and a shared member of a target email; and
the creating a discussion group comprising the group member based on the group creating request message comprises:
creating a discussion group comprising the sharer and the shared member based on the group creating request message.

3. The method according to claim 2, wherein the group creating request message is generated through the mail server by:
receiving a sharing instruction, wherein the sharing instruction is generated by a mail client device of the sharer based on the target email, and the sharing instruction comprises the identification of the group member; and
generating the group creating request message based on the sharing instruction.

4. The method according to claim 1, wherein the group member comprises a sender, a recipient and a carbon copy person of the target email; and
the creating a discussion group comprising the group member based on the group creating request message comprises:
creating a discussion group comprising at least one of the sender, the recipient and the carbon copy person, based on the group creating request message.

5. The method according to claim 3, wherein after the creating a discussion group comprising the group member based on the group creating request message, the method further comprises:
receiving a processing instruction, wherein the processing instruction is generated by a mail client device of a user based on the target email, and the processing instruction comprises an identification of the user; and
adding the user to the discussion group as a group member based on the identification of the user.

6. The method according to claim 1, wherein after the sending the group creating notification message to the mail client device through the mail server, the method further comprises:
receiving a discussion group state update message from a first client device; and
sending the discussion group state update message to a second client device, to update a state of the displayed discussion group by the second client device based on the discussion group state update message,
wherein the first client device is the mail client device and the second client device is the IM client device, or
wherein the first client device is the IM client device and the second client device is the mail client device.

7. The method according to claim 6, wherein the discussion group state update message comprises at least one of: a group member update message, dissolution of the discussion group, update of discussion information in the discussion group and update of a reading status of the discussion information in the discussion group.

8. The method according to claim 7, wherein after the receiving the discussion group state update message from a first client device, the method further comprises:
adding the group member update message to a message queue, wherein the group member update message comprises withdrawing of an existing group member and/or an addition of a new group member;
receiving a group member state acquisition instruction from the mail server;
sending the group member update message to the mail server based on the group member state acquisition instruction, to update a target email collaborator list by the mail server based on the group member update message.

9. The method according to claim 6, wherein the group member state acquisition instruction is generated when the mail server monitors that a group member update message is added to the message queue of an IM server.

10. The method according to claim 1, wherein after the sending the group creating notification message to the mail client device through the mail server, the method further comprises:
receiving from the mail server a group member addition request message comprising an identification of a new member; and
adding the new member to the discussion group based on the group member addition request message.

11. The method according to claim 10, wherein the group member addition request message is sent when the mail server shares the target email with the new member.

12. The method according to claim 2, further comprising:
receiving an editing content message from the mail server, wherein the editing content message is sent from a document server to the mail server after the document server edits a shared document corresponding to the target email based on a mail editing instruction sent by the mail client device of the group member; and
sending the editing content message to the discussion group on the IM client device for display.

13. An information interaction method, comprising:
receiving a sharing instruction, wherein the sharing instruction is generated by a mail client device of a sharer based on the target email, and generating a group creating request massage comprising an identification of a group member based on the sharing instruction; and
sending the group creating request massage to an IM server, wherein the IM server creates a discussion group comprising the group member based on the group creating request message, and sends the group creating notification message to both an IM client device and a mail client device of the group member to display the discussion group on the IM client device and the mail client device, wherein the group member in the discussion group on the IM client device is the same as the group member in the discussion group on the mail client device,
wherein the method further comprises:
in a case that discussion information is received from one group member of the discussion group on the IM client device, sending the discussion information to the mail client device in the discussion group, to synchronously display the discussion information for each group member of the discussion groups on both the mail client device and the IM client device; and
in a case that discussion information is received from one group member of the discussion group on the mail client device; sending the discussion information to the IM client device in the discussion group, to synchronously display the discussion information for each group member of the discussion groups on both the mail client device and the IM client device.

14. The method according to claim 13, wherein after the sending the group creating request message to the IM server, the method further comprises:
  monitoring a message queue of the IM server, and generating a group member state acquisition instruction when it is determined that a group member update message is added to the message queue;
  sending the group member state acquisition instruction to the IM server;
  receiving the group member update message, wherein the group member update message is sent by the IM server based on the group member state acquisition instruction; and
  updating a target email collaborator list based on the group member update message.

15. The method according to claim 14, wherein after the updating a target email collaborator list based on the group member update message, the method further comprises:
  assigning a processing permission of the target email to a new member of the group and canceling a processing permission of the target email enjoyed by a member withdrawing from the group, based on the updated target email collaborator list.

16. The method according to claim 13, wherein after the sending the group creating request message to the IM server, the method further comprises:
  receiving a group member addition request message comprising an identification of a group member from the mail client device; and
  sending the group member addition request message to the IM server, to add the group member to the discussion group by the IM server based on the group member addition request message.

17. The method according to claim 13, further comprising:
  receiving a request for viewing a message card from the IM client device;
  determining an email corresponding to the message card based on the request for viewing the message card; and
  sending the determined email to the IM client device, to display content of the email on the IM client device.

18. An information interaction apparatus, comprising:
  one or more processors; and
  a storage device configured to store one or more programs that, when being executed by the one or more processors, cause the one or more processors to
  receive a group creating request message comprising an identification of a group member and create a discussion group comprising the group member based on the group creating request message, wherein the group creating request message is sent by a mail server;
  send a group creating notification message to an IM client device of the group member, to display the discussion group on the IM client device based on the group creating notification message; and
  send the group creating notification message to a mail client device through the mail server, to display the discussion group on the mail client device based on the group creating notification message, wherein the group member in the discussion group on the IM client device is the same as the group member in the discussion group on the mail client device,
  wherein one or more programs, when being executed by the one or more processors, cause the one or more processors to:
  receive discussion information from one group member of the discussion group on the IM client device; and send the discussion information to the mail client device in the discussion group, to synchronously display the discussion information for each group member of the discussion groups on both the mail client device and the IM client device; or
  receive the discussion information from one group member of the discussion group on the mail client device; and send the discussion information to the IM client device in the discussion group, to synchronously display the discussion information for each group member of the discussion groups on both the mail client device and the IM client device.

19. An information interaction apparatus, comprising:
  one or more processors; and
  a storage device configured to store one or more programs that, when being executed by the one or more processors, cause the one or more processors to
  receive a sharing instruction, wherein the sharing instruction is generated by a mail client device of a sharer based on a target email; and create a group creating request massage comprising an identification of a group member based on the sharing instruction;
  send the group creating request massage to the IM server, wherein the IM server creates a discussion group comprising the group member based on the group creating request message, and sends a group creating notification message to an IM client device of the group member, to display the discussion group on the IM client device based on the group creating notification message; and
  send the group creating notification message to a mail client device through the mail server, to display the discussion group on the mail client device based on the group creating notification message, wherein the group member in the discussion group on the IM client device is the same as the group member in the discussion group on the mail client device,
  wherein one or more programs, when being executed by the one or more processors, cause the one or more processors to:
  in a case that discussion information is received from one group member of the discussion group on the IM client device, send the discussion information to the mail client device in the discussion group, to synchronously display the discussion information for each group member of the discussion groups on both the mail client device and the IM client device; and
  in a case that discussion information is received from one group member of the discussion group on the mail client device, send the discussion information to the IM client device in the discussion group, to synchronously display the discussion information for each group member of the discussion groups on both the mail client device and the IM client device.

* * * * *